(12) United States Patent
Dai et al.

(10) Patent No.: US 8,154,658 B2
(45) Date of Patent: Apr. 10, 2012

(54) TELEVISION AND METHOD FOR ADDING DATAFILES THEREIN

(75) Inventors: Lung Dai, Taipei Hsien (TW); Zhi-Peng Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 763 days.

(21) Appl. No.: 12/261,053

(22) Filed: Oct. 30, 2008

(65) Prior Publication Data

US 2009/0115900 A1    May 7, 2009

(30) Foreign Application Priority Data

Nov. 2, 2007    (CN) .......................... 2007 1 0202366

(51) Int. Cl.
*H04N 7/00*    (2006.01)
*H04N 11/00*    (2006.01)
(52) U.S. Cl. ............. 348/552; 348/553; 436/43; 436/40
(58) Field of Classification Search .................. 348/552, 348/705, 706, 553; 710/15, 19, 104, 302, 710/313; 463/29, 43–45
See application file for complete search history.

(56) References Cited

U.S. PATENT DOCUMENTS

| 4,296,930 | A | 10/1981 | Frederiksen | |
|---|---|---|---|---|
| 7,305,503 | B2 * | 12/2007 | Lefevre et al. | 710/104 |
| 7,814,022 | B2 * | 10/2010 | Gupte | 705/59 |
| 2004/0189827 | A1 * | 9/2004 | Kim et al. | 348/231.4 |

FOREIGN PATENT DOCUMENTS

| CN | 1296221 A | 5/2001 |
|---|---|---|
| CN | 1885921 A | 12/2006 |

* cited by examiner

*Primary Examiner* — Michael Lee
(74) *Attorney, Agent, or Firm* — Altis Law Group, Inc.

(57) ABSTRACT

A television includes a device memory for storing a plurality of data files; an interface for connecting an external device to the television; and a detector used for detecting whether the external device is connected to the television and detecting whether the external device has files, and generating a file detected signal when the external device has files; a process module configured for detecting whether the files in the external device are the same as the files in the device memory, and outputting options for selection when the files in the external device is not the same as the files in the device memory; an input module for receiving operational inputs and generating optional selection signal when receiving the options from the process module; the process module is further configured for generating an add signal when detecting a voltage of the optional selection signal is high; an add module used for copying the files from the external device to the television based on the add signal.

9 Claims, 2 Drawing Sheets

TELEVISION AND METHOD FOR ADDING DATAFILES THEREIN

BACKGROUND

1. Field of the Invention

The present invention relates to televisions, and particularly to a television with an adding module for adding datafiles to the television.

2. Description of Related Art

Nowadays, most television (TV) sets are not only devices for receiving and displaying TV signals but may also include other features such as built-in players for DVD discs and other hardware for playing games.

However, most games are embedded by the manufacturer. Thus newer released video games cannot be stored on the televisions after the TV is manufactured.

Therefore, an improved television is needed to address the aforementioned deficiency and inadequacies, and a method for adding video games in the television is needed.

SUMMARY

A television includes a device memory for storing a plurality of data files; an interface for connecting an external device to the television; and a detector used for detecting whether the external device is connected to the television and detecting whether the external device has files, and generating a file detected signal when the external device has files; a process module configured for detecting whether the files in the external device are the same as the files in the device memory, and outputting options for selection when the files in the external device is not the same as the files in the device memory; an input module for receiving operational inputs and generating optional selection signal when receiving the options from the process module; the process module is further configured for generating an add signal when detecting a voltage of the optional selection signal is high; an add module configured for copying the files from the external device to the television based on the add signal.

Other advantages and novel features of the present invention will become more apparent from the following detailed description of preferred embodiment when taken in conjunction with the accompanying drawings.

DETAILED DESCRIPTION OF THE EMBODIMENTS

References will now be made in detail to the exemplary embodiments of the present disclosure, examples of which are illustrated in the accompanying drawings.

Figure 1:
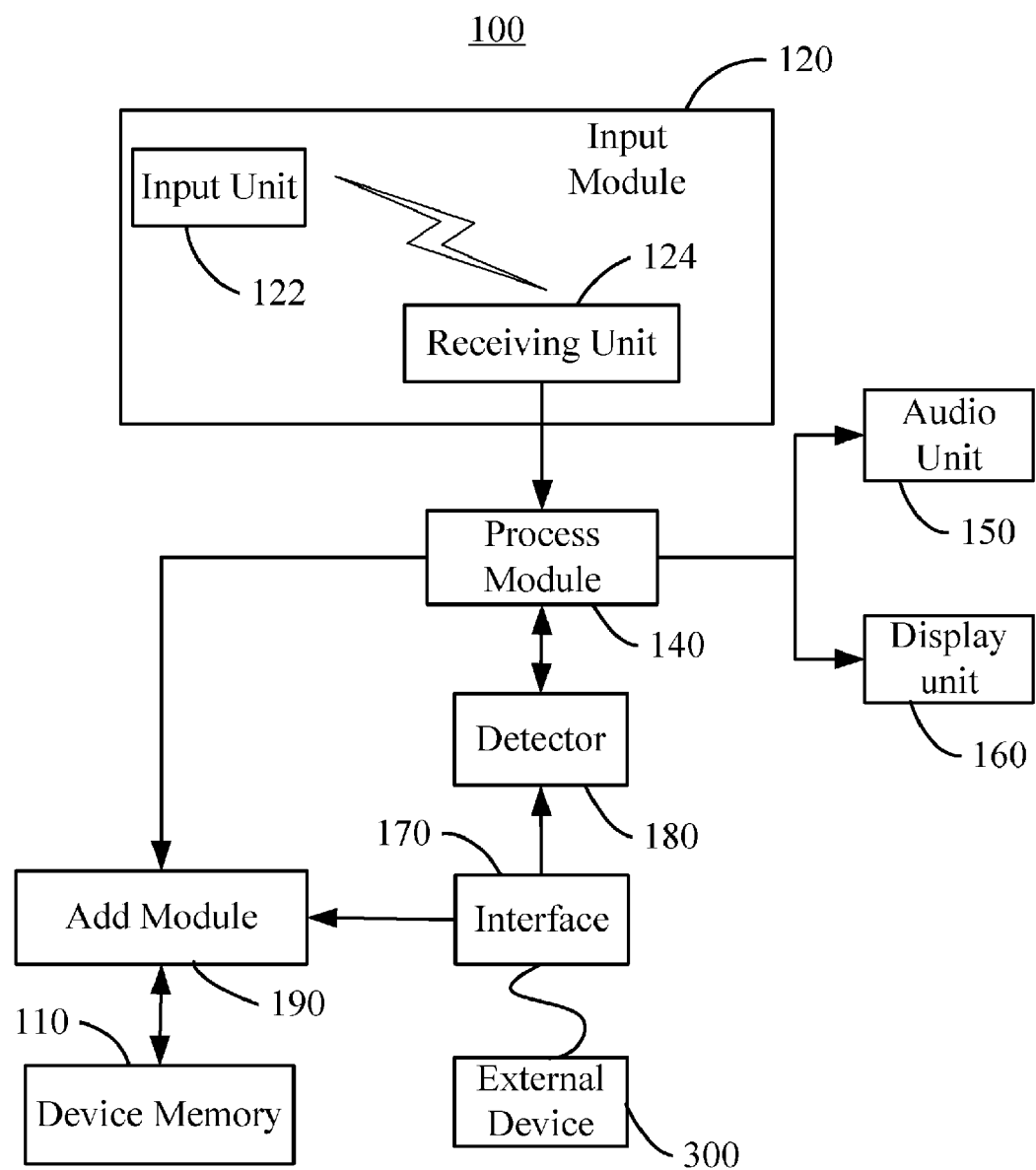
FIG. 1 is a block diagram of a television in accordance with an exemplary embodiment.

Referring to FIG. 1, a television 100 is configured for broadcasting television (TV) programs when in a TV mode and providing video game function in a game mode. The television 100 includes a device memory 110, an input module 120, a process module 140, an audio unit 150, a display unit 160, an interface 170, a detector 180, and an add module 190.

The device memory 110 is used for storing a plurality of data files. In the embodiment the data files are game files. Every game file is a file of a video game. The filename of the game file consists of a header tag and a suffix. For example, the filename may be called warcs.aaa; the header tag is "warcs", and the suffix tag is "aaa". The device memory 110 can be a read/write (rewritable) memory.

The input module 120 is used for receiving operational inputs, and generating corresponding input signals and optional selection signal. The input module 120 includes an input unit 122 and a receiving unit 124. The input unit 122 can be a remote-control device for receiving the operational inputs and generating modulated wireless signals. The receiving unit 124 is used for receiving the modulated wireless signals, and correspondingly generating the input signals and the optional selection signal based on the modulated wireless signals.

The interface 170 is used for connecting an external device 300 to the television 100. The interface 170 may be a universal serial bus (USB) port. The external device 300 may be an external memory, such as a hard disc or a computer, which can be used for storing game files.

The detector 180 is connected to the process module 140 and the interface 170. The detector 180 is configured for detecting whether the interface 170 is connected to the external device 300. The detector 180 is configured for detecting whether the external device 300 connected to the interface 170 has files. The detector 180 is further configured for generating a file detected signal when files are found in the external device 300, and sending the file detected signal to the process module 140. The file detected signal contains filenames of the files in the external device 300.

The process module 140 is configured for receiving the input signals, and generating control signals. The control signals are used for switching an operational mode of the TV between the TV mode and the video game mode, and enabling the audio unit 150 and the display unit 160 after one of operational modes is selected. The audio unit 150 is configured for outputting audio sound. The display unit 160 is configured for displaying video. The process module 140 is also configured for receiving the file detected signal, and detecting whether the suffix of the filenames in the file detected signal are the same as the suffix of filenames of the files stored in the device memory 110. If one of the suffixes of the filenames matches the suffix of the filenames of the files stored in the device memory 110, the process module 140 detects whether one of the header tags of the filenames having the suffix as the filenames in the device memory 110 matches one of the header tags of the filenames in the device memory 110. If the header tag of one or more filenames of the files in the external device 300 is/are different from one or more of the header tags of the filenames of the files in the device memory 110, the process module 140 outputs options for selection. The input module 120 receives the operational input, and generates the optional selection signal. The voltage of the optional selection signal represents the choice of option selection, a high voltage indicates that the add new game option has been selected to add new game files to the television 100, or a low voltage indicates that the add new game option has not been selected. The process module 140 is further configured for receiving the optional selection signal, and generating an add signal when the voltage of the optional selection signal is high. The add signal consists of filenames that have the suffix as the filenames of the files stored in the device memory 110 have and the header tags does not match any header tags of the filenames in the television.

The add module 190 is connected to the device memory 110, the process module 140, and the interface 170. The add module 190 is configured for receiving the add signal from the process module 140, and copying files from the external device 300 to the television 100 based on the filenames in the add signal.

Figure 2:
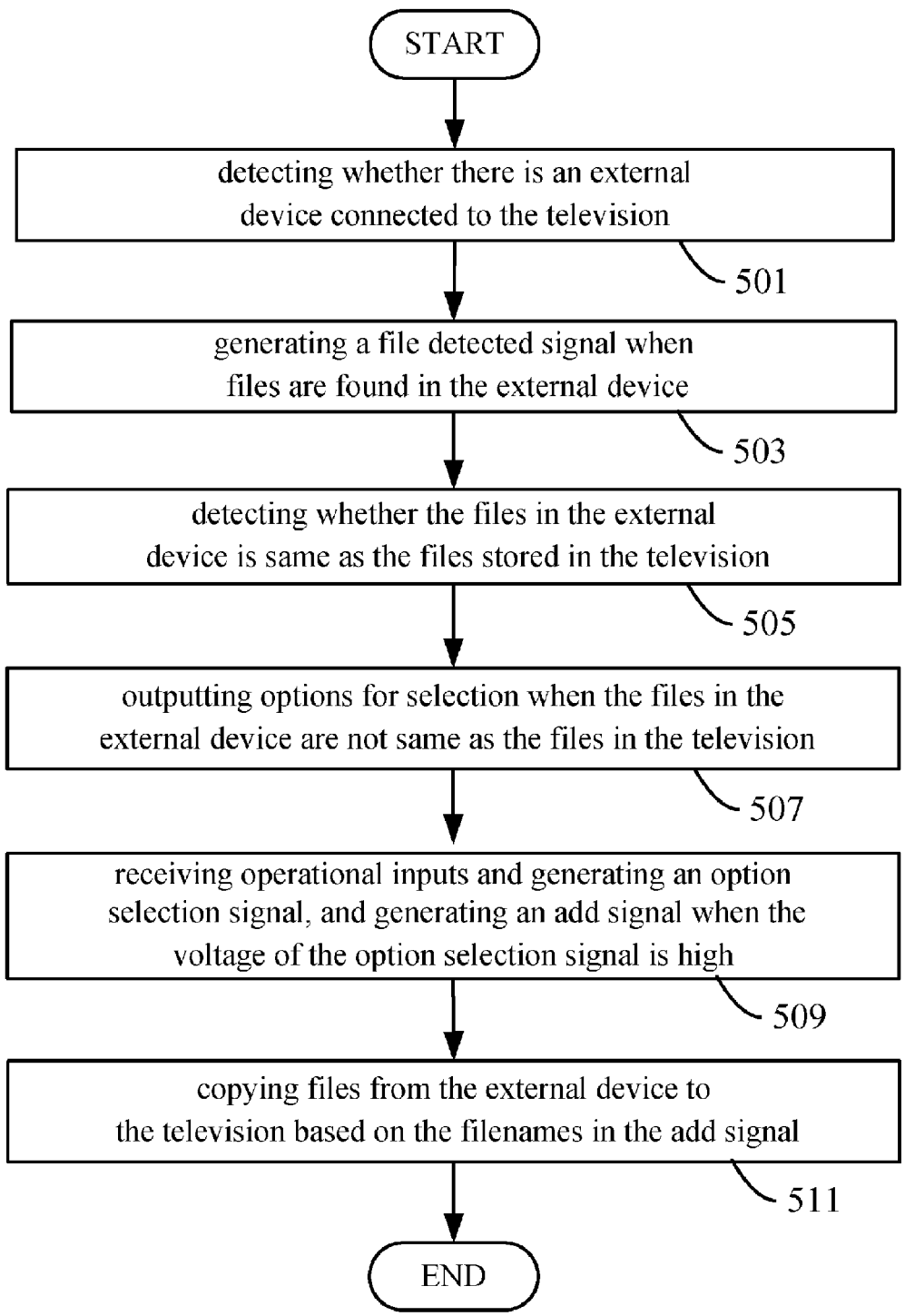
FIG. 2 is a flow chart of a method for adding datafiles in a television in accordance with an exemplary embodiment.

Referring to FIG. 2, a method for adding datafiles in a television in accordance with an exemplary embodiment is illustrated. The method for adding video games in a television may be implemented by the television 100 illustrated in FIG. 1. The various actions in the method for adding video games in a television may be performed in the order presented, or may be performed in a different order. Furthermore, in some embodiments, some actions listed in FIG. 2 may be omitted from the method for adding video games in a television.

At block 501, an action is performed for detecting whether there is an external device connected to the television. The external device may be a memory, such as a hard disc.

At block 503, an action is performed for generating a file detected signal when files are found in the external device. The file detected signal contains filenames of the files in the external device.

At block 505, an action is performed for detecting whether the files in the external device is/are same as the files stored in the television. The action detects whether the suffix of the filenames in the file detected signal are the same as the suffix of the filenames in the television, and comparing whether the header tags of the filenames having the same suffix as the filenames in the television are the same as the header tags of filenames in the television.

At block 507, an action is performed for outputting options for selection when the files in the external device are not same as the files in the television.

At block 509, an action is performed for receiving operational inputs and generating an optional selection signal, and generating an add signal when the voltage of the optional selection signal is high. The add signal consists of filenames that have the suffix as the filenames of the files stored in television have and the header tags does not match any header tags of the filenames in the television.

At block 511, an action is performed for copying files from the external device to the television based on the filenames in the add signal.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A television, comprising:
   a device memory storing a plurality of game files;
   an interface for connecting an external device to the television;
   a detector used for detecting whether the external device is connected to the television and detecting whether the external device has game files, and generating a file detected signal when the external device has game files;
   a process module configured for receiving the file detected signal and detecting whether the game files in the external device are the same as the game files in the device memory, and outputting options for selection when the game files in the external device are not the same as the game files in the device memory;
   an input module for receiving operational inputs and generating optional selection signal when receiving the options from the process module;
   the process module is further configured for generating an add signal when detecting a voltage of the optional selection signal is high;
   an add module configured for copying the game files from the external device to the television based on the add signal, wherein the process module executes the game files to play games.

2. The television as claimed in claim 1, wherein the input module is further configured for receiving operational inputs and generating input signals, and the process module for generating control signals based on the input signals.

3. The television as claimed in claim 2, wherein the input module includes an input unit for receiving operational inputs and generating modulated wireless signal, and a receiving unit for receiving the modulated wireless signal and generating input signals.

4. The television as claimed in claim 2, wherein the file detected signal consists of filenames of the game files in the external device, the process module is further configured for detecting whether the suffix of the filenames in the file detected signal are the same as the suffix of filenames of the game files stored in the device memory, and detecting whether header tags of the filenames in the file detected signal having the same suffix as the filenames in the device memory matches the header tags of the filenames in the device memory.

5. The television as claimed in claim 4, wherein the add signal consists of filenames that have the suffix as the filenames of the game files stored in the device memory have and the header tags does not match any header tags of the filenames in the television.

6. The television as claimed in claim 1, wherein the television also includes an audio unit configured for outputting audio sound, and a display unit configured for displaying video.

7. The television as claimed in claim 1, wherein the interface is a universal serial bus port.

8. A method for adding game files to a television, the method comprising:
   detecting whether there is an external device connected to the television;
   generating a file detected signal when game files are found in the external device;
   detecting whether the game files in the external device are the same as the game files in the television;
   outputting options for selection when the game files in the external device are not the same as the game files in the television;
   receiving operational inputs and generating an optional selection signal, and generating an add signal when the voltage of the optional selection signal is high;
   copying game files from the external device to the television based on the filenames in the add signal, wherein the game files are executed by the television to play games.

9. The method for adding game files in a television as claimed in claim 8, wherein the add signal consists of filenames that have the suffix as the filenames of the game files stored in television have and the header tags does not match any header tags of the filenames in the television.

* * * * *